US012754640B2

(12) United States Patent
Vilkhovyi

(10) Patent No.: US 12,754,640 B2
(45) Date of Patent: Oct. 6, 2026

(54) CALIBRATION METHOD FOR AN ELECTRONIC DISPLAY SCREEN FOR TOUCHLESS GESTURE CONTROL

(71) Applicant: AMERIA AG, Heidelberg (DE)

(72) Inventor: Ihor Vilkhovyi, Dossenheim (DE)

(73) Assignee: AMERIA AG, Heidelberg (DE)

( * ) Notice: Subject to any disclaimer, the term of this patent is extended or adjusted under 35 U.S.C. 154(b) by 0 days.

(21) Appl. No.: 18/846,716

(22) PCT Filed: Apr. 7, 2023

(86) PCT No.: PCT/EP2023/059335
§ 371 (c)(1),
(2) Date: Sep. 13, 2024

(87) PCT Pub. No.: WO2023/194616
PCT Pub. Date: Oct. 12, 2023

(65) Prior Publication Data
US 2025/0383735 A1 Dec. 18, 2025

(30) Foreign Application Priority Data
Apr. 8, 2022 (EP) .................................... 22167386

(51) Int. Cl.

| | |
|---|---|
| ***G06F 3/042*** | (2006.01) |
| ***G06F 3/01*** | (2006.01) |
| ***G06F 3/041*** | (2006.01) |
| ***G06T 7/73*** | (2017.01) |

(52) U.S. Cl.
CPC ............ *G06F 3/0425* (2013.01); *G06F 3/017* (2013.01); *G06F 3/0418* (2013.01); *G06T 7/73* (2017.01); *G06F 2203/04108* (2013.01); *G06T 2207/30196* (2013.01); *G06T 2207/30204* (2013.01)

(58) Field of Classification Search
None
See application file for complete search history.

(56) References Cited

U.S. PATENT DOCUMENTS

2019/0114801 A1* 4/2019 Shimaoka ................. G06T 7/80
2020/0389691 A1* 12/2020 Yoshizawa ............... G09G 3/20

FOREIGN PATENT DOCUMENTS

EP 3508812 7/2019

* cited by examiner

*Primary Examiner* — Parul H Gupta
(74) *Attorney, Agent, or Firm* — Blueshift IP; Robert Plotkin

(57) ABSTRACT

A computer-implemented method of calibrating an electronic display screen for touchless gesture control using a calibration device having a calibration pattern, wherein the method comprises: detecting, using at least one depth camera, the calibration pattern of the calibration device, the calibration device being placed on the electronic display screen in a calibration position; determining borders of the electronic display screen based at least on the detected calibration pattern, a reference pattern being usable for determining an orientation of the detected calibration pattern, and a screen dimension information with respect to the electronic display screen; defining a touchless gesture control input area for the electronic display screen being observable by the at least one depth camera.

15 Claims, 9 Drawing Sheets

CALIBRATION METHOD FOR AN ELECTRONIC DISPLAY SCREEN FOR TOUCHLESS GESTURE CONTROL

TECHNICAL FIELD

The present invention generally relates to calibration techniques for touchless gesture control, and more particularly to a method of calibrating an electronic display screen for touchless gesture control. Further, the present invention relates to a calibration device for use in an aforementioned method.

BACKGROUND

Electronic display devices have nowadays become omnipresent in various areas of modern life. Examples include electronic display screens in public places which provide useful information to the user, e.g. in shopping malls, trade shows, train stations, airports, and the like, a field which is commonly termed "digital signage". One form of such electronic display screens are touchscreens that provide interactive functions to allow users to interact with the information, e.g. by selecting control elements such as buttons, selecting items from a list, controlling a cursor, and the like. Such public touchscreens are nowadays used e.g. in ticketing machines, check-out systems in supermarkets or restaurants, interactive signposts, and the like.

However, not least because of the recent COVID-19 pandemic, users have become hesitant to use touchscreens in public places because of health concerns. This has created a desire to provide input capabilities, in particular gesture control, without having to physically touch the display. Some commercial products have already addressed this desire, for example:

The touchless air gesture technology of Gestoos (https://gestoos.com/) aims at transforming touchscreens or digital displays into a touch-free experience. The Gestoos technology uses a depth sensor to allow the user to control the mouse cursor of the operating system, mapping the finger coordinates to its screen position, while the fingers stay at a distance from the screen.

GLAMOS (https://www.kickstarter.com/projects/300948436/glamos-bring-your-touchless-screens-to-life), sets out to use lidar technology to turn screens into interactive touch screens.

AIRxTOUCH (https://www.airxtouch.com/) provides an all-in-one touchless interactive kiosk. Depth sensors detect the user's finger before it touches the display and generates click events. The related international patent application WO 2015/139969 provides technological background.

Touchjet (https://www.touchjet.com/wave-lily/) aims at turning flat screen TVs into a tablet for collaboration and interactive presentations using a digital pen.

Ultraleap (https://developer.leapmotion.com/touchfree/) provides leapmotion, which is a small device (infrared camera) with relatively small range for hand tracking and hand gesture recognition. The system uses a single camera, so that the hand recognition precision is limited and decreases the bigger the screen is.

However, the known technologies either provide complete all-in-one hardware solutions to replace existing displays, provide only limited hand recognition precision or they require a cumbersome calibration of sensors that are added to an existing display to reliably detect gestures. What is needed is an easier way of calibrating electronic display screens, in particular retrofitting existing touchscreens or electronic display screens, to provide touchless control capabilities that is easy to set up.

It is therefore the technical problem underlying the present invention to provide an improved calibration method for calibrating an electronic display screen for touchless gesture control, thereby at least partly overcoming the disadvantages of the prior art.

SUMMARY

The problem is solved by the subject-matter defined in the independent claims. Advantageous modifications of embodiments of the invention are defined in the dependent claims as well as in the description and the figures.

According to a first aspect of the present invention, a computer-implemented method of calibrating an electronic display screen for touchless gesture control, using a calibration device having a calibration pattern, is provided. The method may comprise detecting the calibration pattern of the calibration device, the calibration device being placed on the electronic display screen in a calibration position. For detecting, at least one depth camera may be used. The method may comprise determining borders of the electronic display screen based at least on the detected calibration pattern, a reference pattern being usable for determining an orientation of the detected calibration pattern, and a screen dimension information with respect to the electronic display screen. The method may further comprise defining and/or determining a touchless gesture control input area for the electronic display screen being observable by the at least one depth camera.

The term electronic display screen can include any type of display that is powered by electrical energy. In particular, it includes all types of LCD screens, LED screens, touch screens, e-ink screens and the like. The size and shape of the screens may vary.

The term border of the electronic display screen may be understood to mean the edge of the screen layer onto which gesture input is intended to be recognized. In particular, if the electronic display screen comprises a framing, the border may refer to the inner edge of the framing.

The term touchless gesture control encompasses the control of content, control elements, display elements, information offers and setting parameters through user gestures. In particular, it includes any kind of interaction of a user with the electronic display screen that is based on movements of a user's extremities, in particular a user's arm, hand or finger(s). Examples of such movement include, in particular, click movements and swipe movements that can be performed with the hand and/or fingers of a user. As another example, handshape-based gestures may be included, particularly the clenching of a first or the spreading of fingers.

The term calibration device includes any type of suitable equipment that enables the calibration method to be carried out. Examples of such calibration devices can be found in the second aspect of the present invention. It may be provided that the method comprises a plurality of calibration modes that may be determined prior to running the calibration process by user input, in particular by user selection. It is particularly advantageous if the calibration modes are associated with a type of calibration device intended to be used for calibration. Different types of calibration devices may be calibration devices with different number of feet, or having a rod or not, as described below with respect to the second aspect of the present invention.

The at least one depth camera may be placed at or near an upper edge of the electronic display screen and/or at or near a lower edge of the electronic display screen. For example, if the electronic display screen comprises a framing, the at least one depth camera may be mounted at this framing. The at least one depth camera may for example be an Intel RealSense depth camera.

The detected calibration pattern of the calibration device may be any type of machine-readable pattern, preferably including at least one fiducial marker. Examples for a suitable calibration pattern are AprilTags and/or QR-Codes, and/or three-dimensional patterns, e.g. having a spherical shape.

The term reference pattern may be understood to be a digital representation or replica of the actual calibration pattern of the calibration device. The reference pattern may be stored on a memory of the electronic display screen or on a in server with which the electronic display screen may communicate. In case if the reference pattern is stored on a server, the reference pattern may be preserved to the electronic display screen at runtime.

In general, the calibration according to the first aspect of the present invention may be performed locally on the electronic display screen, for example using a processor of the electronic display screen, or may be performed remotely on a server with which the electronic display screen may communicate, preferably at runtime. The server may be a cloud-based calibration platform.

The term orientation may include, in particular, a rotation of the calibration device about a plane-normal of the electronic display screen. Further, the term orientation may include a tilting of the calibration device with respect to the plane-normal of the electronic display screen.

The term calibration position may include a predetermined position of the calibration device when placed on the electronic display screen and preferably also the orientation of the calibration device as described above. Further details are disclosed below.

The term screen dimension information may include any information of set of information which allows to derive the size of the screen, in particular of the screen layer of the electronic display screen. Further, the screen dimension information may include information which allows to derive the shape of the electronic display screen, for example being rectangular of squared.

The term input area of the electronic display screen refers in general to the screen layer of the electronic display screen on which content may be displayed during an interaction of a user and with which a user may interact. For enabling gesture input, the input area may include or be equal to a virtual screen layer which is defined to extend distanced by a predetermined distance parallel to the electronic display screen. In other words, the input area may be a spatial area which is e.g. parallel to the screen layer and which is observed by the at least one depth camera to recognize gesture inputs of users. Thus, it may be provided that determining a touchless gesture control input area comprises a definition of a virtual screen layer being essentially parallel to the electronic display screen, preferably at a distance d and/or a definition of the dimensions of the electronic display screen and/or a definition of a coordinate system, preferably a cartesian coordinate system with an x-axis and a y-axis, each being parallel to the electronic display screen, and a z-axis being orthogonal to the electronic display screen.

The method may further comprise the definition of setup-parameters associated with the input area. Preferably, the setup-parameters include the definition of the input area. Further, the setup-parameters may include predefined gestures, gesture velocities and/or other parameters associated with the functionality of the electronic display screen with respect to user interaction. It is particularly preferred if the setup-parameters include a tolerance range with respect to the input area which allows to compensate slight calibration inaccuracies, so that the user experience during user interaction is not adversely affected.

The proposed method according to the present invention is particularly advantageous as it allows a simple and at the same time precise calibration of electronic display screens of any kind. In particular, only a few steps are required since the calibration device only has to be placed once. Thus, the calibration can be completed in a short time. It is beneficially possible to equip also already existing electronic display screens, for example with touchscreens or non-touchscreens, which may have been in use for years, with a gesture control option. For example, depth cameras can be mounted on an existing electronic display screen and the corresponding software can be executed for calibration.

For determining borders of the electronic display screen based on the detected calibration pattern, for example, the detected calibration pattern may at least partially be analyzed, preferably using image analysis, in particular depth image analysis, preferably also using the reference pattern. Then, in particular based on at last some of the results of this analysis, the position of at least one depth camera may be determined, in particular relatively to the calibration pattern and therewith relatively to the calibration device and/or vice versa. Based on this information, in particular with respect to and/or with additional consideration of at least one depth camera's field of view and/or with further information about the electronic display screen, for example about its dimensions, borders of the electronic display screen can be determined, in particular if at least one depth camera is arranged at or near the electronic display screen. Preferably at least one depth camera may be configured to observe a spatial area in front of the electronic display screen, in particular including the calibration device placed on the electronic display screen, in particular when the calibration device is placed in a calibration position. Based on the previously obtained information and/or using the previously obtained information, in particular based on the determined borders of the electronic display screen and/or using the determined borders of the electronic display screen, a touchless gesture control input area for the electronic display screen being observable by the at least one depth camera may be defined and/or determined. By defining and/or determining the touchless gesture control input area based on and/or using the determined borders of the electronic display screen, a touchless gesture control input area can be obtained, which size may, for example, be adapted to the electronic display screen size. This allows providing an advantageous user experience.

The method may further comprise displaying, a calibration guiding mark on the electronic display screen, preferably in or near the center of the electronic display screen, for guiding a user to place the calibration device in the calibration position. The calibration position may include a predetermined position of the calibration device on the electronic display screen and preferably also a predetermined orientation of the calibration device with respect to the electronic display screen. Preferably, the calibration guiding mark is displayed in the center of the electronic display screen such that for calibration, it can be assumed that the calibration device is in a calibration position in the middle of the screen.

Using a calibration guiding mark provides an easy and efficient support for a user calibrating an electronic display screen. Further, the quality of a calibration process may be enhanced by providing a calibration guiding mark. In other words: Using at least one calibration guiding mark makes it easy to find an aligned position and/or in an aligned orientation of a calibration device on the electronic display screen, thus increasing the risk of a wrong calibration.

It may be provided that the calibration guiding mark comprises two, preferably three, markings being displayed on the electronic display screen, wherein the markings may have different colors and/or shapes. As described above, the number of displayed calibration guiding marks may depend on the type of calibration device which is used.

By using different colors of the markings, the degrees of freedom in which the calibration device may be placed on the electronic display screen is reduced in an advantageous manner. Therefore, the risk of positioning the calibration device deviating from an optimal position on the electronic display screen is reduced. Providing more than one marking in conjunction with a calibration device having more than one foot, in particular supports the user to place the calibration device, if needed, in a predetermined position in the rotational direction around a normal of the electronic display screen.

For example, if the calibration device has a first and a second foot, the respective calibration mode, as describes above, may be chosen by a user. During calibration, the electronic display screen may accordingly display two markings, one for the first foot and one for the second foot.

Alternatively or additionally, the electronic display screen may provide at least one orientation reference marking, preferably at the guiding mark. This may unequivocally guide a user to a particular positioning of a calibration device on the electronic display screen, preferably to place the calibration device on the electronic display screen in a specific rotational orientation with respect to a plane-normal of the electronic display screen. The orientation reference marking may for example be provided at or near the edge of the displayed calibration guiding mark and/or at or near the edge of respective marking(s).

If the used calibration device has a corresponding reference marking on its foot surface(s), the user is supported to position calibration device correctly, in particular such that the respective reference marking and the respective displayed orientation reference marking are at least partially overlapping. This supports the user to place the calibration device, if needed, in a predetermined position in the rotational direction around a plane-normal of the electronic display screen. In other words, providing an orientation reference marking will reduce the degrees of freedom in which the calibration device may be placed on the electronic display screen in an advantageous manner. The quality of a calibration process may therefore be enhanced.

In one particularly preferred embodiment, two orientation reference markings may be displayed. For example, the orientation reference markings may have at least one distinctive attribute such that the two orientation reference markings are distinguishable by a user. For example, the two orientation reference markings may differ in their color or shape. Analogous to the above-described orientation reference marking, in this case it may be provided that the calibration device, in particular respective footing(s) of the calibration device, comprise corresponding reference markings, wherein a user can visually associate the reference markings of the footing(s) and the orientation reference markings displayed on the electronic display screen and place the calibration device accordingly on the electronic display screen. Providing more than one reference marking reduces the risk of positioning the calibration device deviating from an optimal position on the electronic display screen.

For example, if the calibration device has one foot having one reference marking, the respective calibration mode, as describes above, may be chosen by a user. During calibration, the electronic display screen may accordingly display the calibration guiding mark including one orientation reference marking.

It may be provided that at least the steps of detecting the calibration pattern, determining borders of the electronic display screen and defining a touchless gesture control input area are triggered upon receiving a user input or upon automatically detecting that the calibration device is in the calibration position. Detecting that the calibration device is in the calibration position may include detecting a calibration triggering mark of the calibration device. The calibration triggering mark may be an acoustic mark and/or visual mark. With respect to the technical implementation and benefits of this particular feature, it is referred to the description of the second aspect of the present invention.

It may be provided that determining borders of the electronic display screen comprises at least one base transformation operation of a coordinate system. Alternatively of additionally, a matrix multiplication may be performed. Additionally or alternatively an inversion of a Matrix may be performed.

It may be provided that determining borders of the electronic display screen comprises determining, using the at least one depth camera, a center of the calibration pattern in 3D and defining a coordinate system, wherein the center of the calibration pattern is the origin of the coordinate system, and shifting the origin of the coordinate system orthogonal to the screen surface so that the origin of the coordinate system is in the plane of the screen surface.

It may be provided that the screen dimension information with respect to the electronic display screen is received via user input. Alternatively or additionally, the screen dimension information may be determined automatically based on a resolution of the electronic display screen and based on a pixel density of the electronic display screen.

Many operating systems inherently preserve the resolution and the pixel density of a respective display screen. Thus, it is particularly beneficial and convenient to use this information for determining the size of the electronic display screen for determining the borders of the electronic display screen. For this purpose, a simple multiplication of the resolution and the pixel density may be performed.

In the following, an example is given in different words, of how the method may be performed:

Firstly, the at least one depth camera may capture the calibration pattern and may compare it with a reference pattern in order to determine the center point of the calibration pattern and in order to determine the orientation of the calibration pattern as it may be seen by the depth camera at runtime, i.e., from the depth camera's perspective. In particular, by knowing the reference pattern with which the calibration pattern may be associated, the position and orientation of the calibration pattern may be determined in 3D using depth information captured by the depth camera. Further, optionally, by using a calibration guiding mark and preferably a reference marking, the system may know the target position and/or orientation of the calibration device and thus of the calibration pattern.

Based on the known calibration position of the calibration device, in particular when the calibration device is placed on the electronic display screen in the calibration position, and based on the reference pattern, it may be known, in which manner, i.e., shape and/or size and/or distortion, the calibration pattern should appear in image data captured by the depth camera. Thus, a position and/or orientation of the depth camera relative to the calibration position may be determined, if not known.

Secondly, based on the above, a coordinate system may be determined having its origin in the center of the calibration pattern and optionally having a distinct orientation corresponding to the orientation of the calibration pattern. Determining said coordinate system may be performed using a mathematical base transformation operation of an interim coordinate system which may, e.g., have its origin at the depth camera. For general information with respect to coordinate transformations, it is referred to "Elements of Electromagnetics by Matthew Sadiku; ISBN: 978-0199321407; Chapter 2 COORDINATE SYSTEMS AND TRANSFORMATION by HENRY P. BROUGHAM" and to "3D COORDINATE TRANSFORMATIONS published in Surveying and Land Information Systems, Vol. 58, No. 4, December 1998, pp. 223-34".

In said coordinate system, the position and orientation of the depth camera may be known, in particular based on said depth information previously acquired by the depth camera. Thus, at this stage of the calibration, the distance between the central point of the calibration pattern, i.e., the calibration position, and the depth camera is known, including precise coordinates of the depth camera. What may not be known are the corners of the display screen, i.e., the borders of the display screen. By knowing the width and height of the display screen and by knowing the calibration position, the borders may be determined within the coordinate system. Therefore, the step of determining borders of the electronic display screen based at least on the detected calibration pattern, a reference pattern which is usable for determining an orientation of the detected calibration pattern, and screen dimension information with respect to the electronic display screen, may be performed.

Thus, the depth camera and/or how image data of the depth camera is handled, may be calibrated in order to define which part(s) of the depth camera's field of view is relevant for gesture input and where on a scene displayed by the electronic display screen to map any gesture input. Therefore, the step of defining a touchless gesture control input area for the electronic display screen being observable by the at least one depth camera, is performed.

Optionally, shifting the origin of the coordinate system orthogonal to the electronic display screen surface may be performed so that the origin of the coordinate system is in the plane of the electronic display screen surface.

Further, in the following, an easy-to-understand example is given in simple words, of how the method may be performed: An optical sensor may capture image data according to its field of view which covers the calibration device being placed in a calibration position, in particular in an aligned position and/or aligned orientation on the electronic display screen. The calibration device comprises the calibration pattern which is also captured by the optical sensor. Said calibration position may be in the center of the electronic display screen. The electronic display screen may be rectangular having a width and height.

The center of the calibration pattern may be determined, preferably by comparison with a reference pattern and under consideration of the position and/or orientation of the calibration pattern which may be calculated from distortions of the captured calibration pattern compared to the reference pattern.

A coordinate system may be defined having its origin in the center of the calibration pattern. Based on the above-mentioned determined orientation of the calibration pattern and/or based on a plane detection being performed based on the captured image data, the display screen surface and/or a plane being parallel to said surface is determined.

By knowing and taking into account the width and height of the rectangular display screen and the fact that the calibration device is placed in the center of the electronic display screen, the borders of the electronic display screen which may form an essential part of the touchless gesture control input area, may be determined. Thus, the touchless gesture control input area may be easily defined within the field of view of the optical sensor.

Further, in the following, an easy-to-understand example is given in simple words, of how the method may be performed:

A depth camera may capture image data according to its field of view which covers the calibration device being placed in a calibration position, in particular in an aligned position and/or aligned orientation on the electronic display screen. The calibration device comprises the calibration pattern which is also captured by the depth camera. Said calibration position may be in the center of the electronic display screen. The electronic display screen may be rectangular having a width and height.

The center of the calibration pattern may be determined, preferably by comparison with a reference pattern and under consideration of the position and/or orientation of the calibration pattern which may be calculated from distortions of the captured calibration pattern compared to the reference pattern.

A coordinate system may be defined having its origin in the center of the calibration pattern. Based on the above-mentioned determined orientation of the calibration pattern and/or based on a plane detection being performed based on the captured image data, the display screen surface and/or a plane being parallel to said surface is determined.

By knowing and taking into account the width and height of the rectangular display screen and the fact that the calibration device is placed in the center of the electronic display screen, the borders of the electronic display screen which may form an essential part of the touchless gesture control input area, may be determined. Thus, the touchless gesture control input area may be easily defined within the field of view of the depth camera.

The resolution of a display screen is the number of distinct pixels in each dimension that can be displayed. It is usually quoted as width×height, with the unit "pixels". For example, a resolution of 1024×768 means the width is 1024 pixels and the height is 768 pixels.

The pixel density of a display screen is regularly specified in the unit "pixels per inch" (ppi) and/or "pixels per centimeter" (ppcm or pixels/cm). For example, the pixel density of computer monitors, television displays or image digitizing device such as a cameras or image scanners, is regularly given in ppi. Horizontal and vertical pixel density are usually the same, as most devices have square pixels. Other than the resolution, the pixel density describes the amount of detail on a physical surface or device, wherein the resolution describes the amount of pixel information regardless of its scale.

To increase the robustness against errors, a user input can be used additionally. For example, the user can measure the width and height of the electronic display screen and enter it in a suitable unit of measurement, such as cm. If the resolution and/or the pixel density are not available, only a user input can also be used.

It may be provided that detecting the calibration pattern of the calibration device is performed using two depth cameras, the two depth cameras being arranged at borders of the electronic display screen. Preferably, the two depth cameras are arranged at opposing borders of the electronic display screen, for example one being mounted at an upper border and one being mounted at a lower border of the electronic display screen such that both of the depth cameras are able to observe a spatial area which is e.g. parallel to the screen layer.

In this embodiment, a calibration device may be used having a double-sided calibration pattern, i.e. having two calibration patterns on opposite sides. The calibration device may be placed on the electronic display screen in a calibration position, whereby a first calibration pattern at a first side of the calibration device may face a first depth camera, e.g. the depth camera which is mounted at the upper border of the electronic display screen, and whereby a second calibration pattern at a second side of the calibration device may face a second depth camera, e.g. the depth camera which is mounted at the lower border of the electronic display screen. Both depth cameras may detect the respective calibration pattern. The calibration patterns are preferably of the same shape. The calibration with respect to the first and with respect to the second depth camera may be performed sequentially or at the same time.

It may be provided that defining and/or determining a touchless gesture control input area comprises a definition of a virtual screen layer being essentially parallel to the electronic display screen, preferably at a distance d. The virtual screen layer may be a coordinate system, preferably a cartesian coordinate system with an x-axis and a y-axis, each being parallel to the electronic display screen, and a z-axis being orthogonal to the electronic display screen surface.

Touchless gestures for controlling the interface of the electronic display screen may in particular include the control of content, control elements, display elements, information offers and setting parameters through user gestures. In particular, it may include any kind of interaction of a user with the electronic display screen that is based on movements of a user's extremities, in particular a user's arm, hand or finger(s). Examples of such movement include, in particular, click movements and swipe movements that can be performed with the hand and/or fingers of a user. As another example, handshape-based gestures may be included, particularly the clenching of a fist or the spreading of fingers.

It may be provided that the calibration pattern is a fiducial marker, preferably an AprilTag and/or a QR-Code, and/or a three-dimensional pattern, preferably having a spherical shape.

According to a second aspect of the present invention, a calibration device may be provided for calibrating an electronic display screen, in particular for use in the computer-implemented method according to the first aspect of the present invention. The calibration device may comprise a main body defining a main axis of the calibration device. The calibration device may comprise a footing at a distal end of the main body. The footing may have at least one footing surface being placeable on the electronic display screen such that the footing surface is in contact with to the electronic display screen. The calibration device may comprise a calibration pattern comprising a machine-readable pattern being detectable by at least one depth camera. In particular, the calibration device may be placed on the electronic display screen, preferably in a calibration position, for calibration. The at least one depth camera may be arranged at or near the electronic display screen and may be configured to observe a spatial area in front of the electronic display screen in order to detect a gesture input of a user.

The calibration pattern may preferably be detectable when the calibration device is placed on the electronic display screen, preferably in calibration position, in particular in a predetermined calibration position, in particular with a predetermined orientation of the calibration device with respect to the electronic display screen.

All technical implementation details and advantages described with respect to the first aspect of the present invention are self-evidently mutatis mutandis applicable for the second aspect of the present invention.

A calibration device as described above is simple in design and easy to manufacture. Furthermore, it can be stowed in a space-saving manner. Furthermore, the handling of the device during calibration is particularly easy and convenient. Further, the quality of a calibration process may be enhanced by using the calibration device of the first aspect of the present invention.

The main body of the calibration device may for example have the shape of a cylinder, or may be in the shape of an ovoid, or may have the shape of an ellipsoid. The main axis may be defined as the central axis, in particular the central longitudinal axis of the main body.

At its proximal end, the main body may comprise a grip part which allows a user to easily and securely hold and handle the calibration device.

The proximal end may be an end that faces a user during use of the device for calibrating an electronic display screen for touchless gesture control. The distal end may be an end on the opposite side with respect to the proximal end of the main body and may in particular be an end that faces the electronic display screen during use of the device for calibrating an electronic display screen.

The footing surface of the first foot may be designed as a flat plate part. The flat plate part may have a plate area that prevents accidental tilting of the calibration device on the electronic display screen while a user places the calibration device on the electronic display screen in order to facilitate a high quality of calibration. In particular, the plate area may be greater than or equal to 1 $cm^2$.

Optionally, the footing surface may be of a material that will not damage the surface of an electronic display screen. Additionally or alternatively, the material may be selected to provide certain slip resistance on a surface of an electronic display screen to improve the handling of the calibration device. For example, the material may be a soft plastic, such as rubber.

Optionally, a reference marking may be provided at least at one portion of the footing surface to guide a user to a particular positioning of the calibration device on the electronic display screen. The reference marking may for example be provided at or near the edge of the footing surface. If the calibration device is used in a calibration process, the electronic display screen may display a calibration guiding mark on which the user may place the footing surface, wherein the guiding mark comprises a corresponding virtual reference marking that allows the user to position the footing surface correctly, in particular such that the reference marking and the virtual reference marking are at least partially overlapping. Providing a reference marking therefore supports the user to place the calibration device, if needed, in a predetermined position in the rotational direction around a normal of the electronic display screen. In other words, providing a reference marking will reduce the degrees of freedom in which the calibration device may be placed on the electronic display screen in an advantageous manner. The quality of a calibration process may therefore be enhanced.

In one particularly preferred embodiment, two reference markings may be provided at portions of the footing surface. For example, the reference markings may have at least one distinctive attribute such that the two reference markings are distinguishable by a user. For example, the two reference markings may differ in their color or shape. Analogous to the above-described virtual reference marking, in this case it may be provided that the electronic display screen displays two virtual reference markings, wherein a user can visually associate the two reference markings of the footing surface and the two virtual reference markings and place the calibration device accordingly on the electronic display screen. Providing more than one reference marking reduces the risk of positioning the calibration device deviating from an optimal position on the electronic display screen.

Alternatively or additionally, the footing surface may be at least partially transparent so that light from an electronic display screen can shine through the footing surface when the footing surface is placed on the electronic display screen. This can further increase positioning accuracy and usability of the calibration device.

It may be provided that the calibration device comprises signaling means configured for signaling, preferably without a further user input, that the calibration device is in a calibration position. The signaling means may be configured for providing a visual marking upon contact of the calibration device with the electronic display screen, the visual marking being detectable by the one or more optical sensors. Optionally, the signaling means comprises a mechanical and/or electronical signaling mechanism configured for revealing the visual marking upon contact of the calibration device with the electronic display screen.

The visual marking may be detected by the optical sensors for triggering a calibration process of the electronic display screen. In other words, a calibration process may be configured to start automatically upon detection of the visual marking. Therefore, by providing the visual marking, an additional user input and/or triggering signal is not necessary and a calibration process may be triggered automatically based on the detection of the visual marking.

A signaling means comprising an electronical signaling mechanism may e.g. comprise a Light Emitting Diode (LED) which gets activated upon contact of the calibration device with the electronic display screen. In that sense, the LED may be a visual marking according to the above description.

One example for a signaling means comprising a mechanical signaling mechanism is described in detail below.

The calibration device may further comprise the following features: At least a portion of the main body may be designed as a sleeve providing a receiving space along the main axis. In the receiving space, a spring may be arranged which may be in physical contact with a bearing part of the main body and may be elastically deformed by a rod. The rod may at least partially be retained in the receiving space and slidably guided along the main axis, wherein the rod may be displaceable relative to the main body into a first and a second position. In the first position of the rod, the spring may be essentially non-deformed and the rod may protrude out of the main body at the distal end.

In the second position of the rod, it may be provided that the spring is elastically deformed and a visual marking of the rod is aligned with a recess of the main body so that the visual marking becomes visible through the recess. This may be one example of a mechanical signaling mechanism in the sense of what is described above.

Alternatively or additionally, it may be provided that an electronic visual marking starts to emit an electromagnetic signal preferably being a light signal. This may be an embodiment in conjunction with an electronical signaling means in the sense of what is describes above.

It may be provided that the spring of the calibration device is a compression spring and is arranged at the proximal end of the main body in the receiving space.

Using a compression spring is a particularly easy way of designing the calibration device comprising the sliding rod. Preferably, the compression spring is made of metal or rubber material. If the compression spring is made of metal, it may for example be a coil spring or a Belleville spring or a disc spring.

It may be provided that the rod builds the first foot, or the first foot is mounted at the rod. This particular embodiment has an advantageous compact design and yet has broad functionality for calibrating an electronic display screen.

It may be provided that the rod builds the first foot, or the first foot is mounted at the rod. This embodiment is particularly space-saving and at the same time easy to handle.

It may be provided that the calibration device comprises a second foot at the distal end, the second foot having a footing surface being placeable on the electronic display screen such that the footing surface is in contact with and parallel to the electronic display screen, wherein the footing surface is oriented at the predetermined angle with respect to the main axis of the calibration device.

Providing a second foot reduces the degrees of freedom in which the calibration device may be placed on the electronic display screen in an advantageous manner. Therefore, the risk of positioning the calibration device deviating from an optimal position on the electronic display screen is reduced.

Further, it may be provided that the calibration device comprises a third foot at the distal end, the third foot having a footing surface being placeable on the electronic display screen such that the footing surface is in contact with and parallel to the electronic display screen, wherein the footing surface is oriented at the predetermined angle with respect to the main axis of the calibration device.

Providing a third foot prevents the calibration device from tilting on the electronic display screen while a user places the calibration device on the electronic display screen. It reduces the degrees of freedom in which the calibration device may be placed on the electronic display screen in an advantageous manner. Therefore, the risk of positioning the calibration device deviating from an optimal position on the electronic display screen is reduced.

The footing surface of the second foot and/or third foot may be designed as a flat plate part. The flat plate part may have a plate area that prevents accidental tilting of the calibration device on the electronic display screen while a user places the calibration device on the electronic display screen in order to facilitate a high quality of calibration. In particular, the plate area may be greater than or equal to 1 $cm^2$.

Optionally, a reference marking may be provided at least at one portion of the footing surface of the first foot and/or second foot to guide a user to a particular positioning of the calibration device on the electronic display screen. The reference marking may for example be provided at or near the edge of the footing surface. If the calibration device is used in a calibration process, the electronic display screen may display a calibration guiding mark on which the user may place the footing surface, wherein the guiding mark comprises a corresponding virtual reference marking that allows the user to position the footing surface correctly, in particular such that the reference marking and the virtual reference marking are at least partially overlapping. Providing a reference marking therefore supports the user to place the calibration device, if needed, in a predetermined position.

It may be provided that each footing surface fall into one common plane when the calibration device is placed on the electronic display screen. This further facilitates that the calibration device can be places in a correct and stable manner on the electronic display screen. The quality of a calibration process may therefore be enhanced.

It may be provided that the calibration pattern is a fiducial marker, preferably an AprilTag and/or a QR-Code, and/or a three-dimensional pattern, preferably having a spherical shape.

According to a third aspect of the present invention, it is provided a data processing apparatus, preferably an electronic display screen, comprising means for carrying out a method according to the second aspect of the present invention.

According to a fourth aspect of the present invention, a kit-of-parts is provided, comprising a calibration device according to the second aspect of the present invention, and at least one depth camera for carrying out a calibration method according to the first aspect of the present invention.

According to a fifth aspect of the present invention, a computer program is provided comprising instructions which, when the program is executed by a computer, cause the computer to carry out a method according to the first aspect of the present invention.

All technical implementation details and advantages described with respect to the first aspect of the present invention are self-evidently mutatis mutandis applicable for the second aspect of the present invention. All technical implementation details and advantages described with respect to the second aspect of the present invention are self-evidently mutatis mutandis applicable for the first aspect of the present invention. All technical implementation details and advantages described with respect to the first and second aspects of the present invention, are self-evidently mutatis mutandis applicable for the third, fourth and fifth aspects of the present invention.

BRIEF DESCRIPTION OF THE DRAWINGS

The disclosure may be better understood by reference to the following drawings.

DESCRIPTION OF PREFERRED EMBODIMENTS

Figure 1:
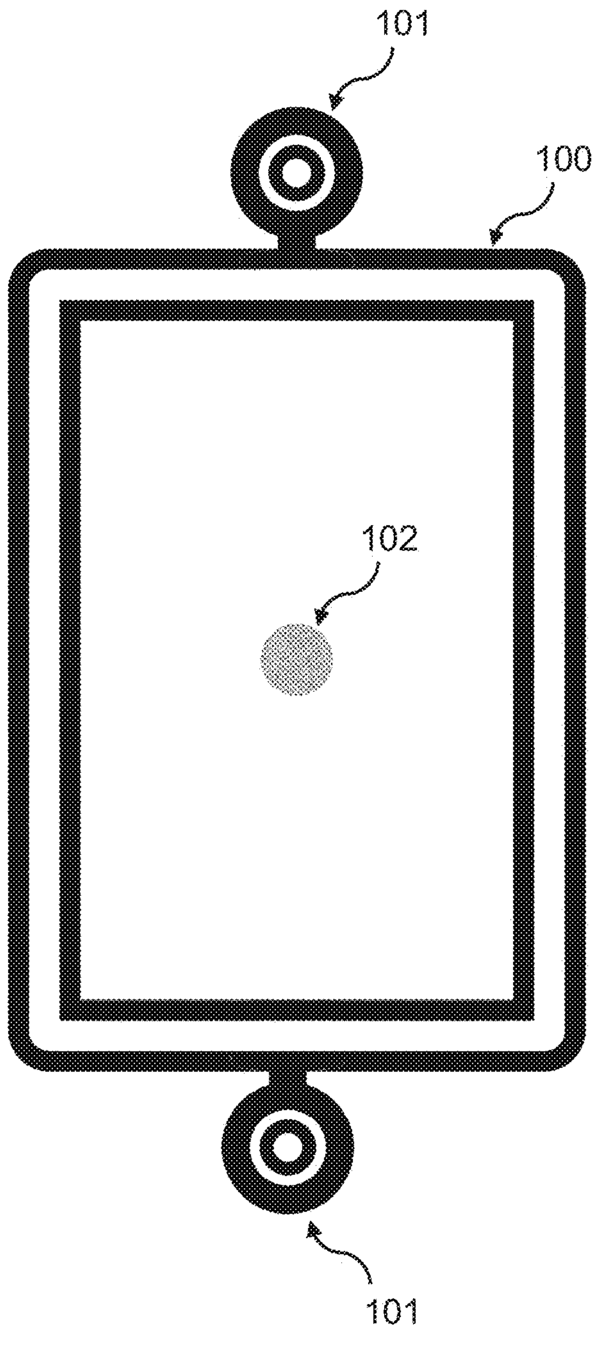
FIG. 1: A first schematic illustration of an electronic display screen according to embodiments of the present invention.

FIG. 1 is a first schematic illustration of an electronic display screen 100. Two depth cameras 101 are mounted at edges of the electronic display screen 100, one at the upper edge and one at the lower edge. As the calibration process is in progress, the electronic display screen 100 displays a calibration guiding mark 102 in the center of the electronic display screen 100. The purpose of displaying the calibration guiding mark 102 is to guide a user to place a calibration device 200, in particular a footing surface 203, on the calibration guiding mark 102. Thus, the calibration device 200 can be placed in the correct calibration position on the electronic display screen 100. In that sense, the calibration guiding mark 102 defines predetermined position of the calibration device 200 on the electronic display screen 100.

Figure 8:
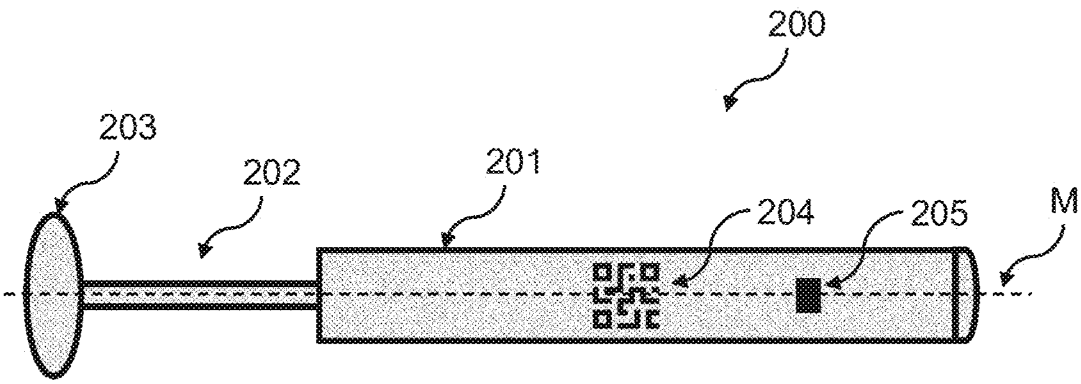
FIG. 8: A first schematic illustration of a calibration device according to embodiments of the present invention.
Figure 9:
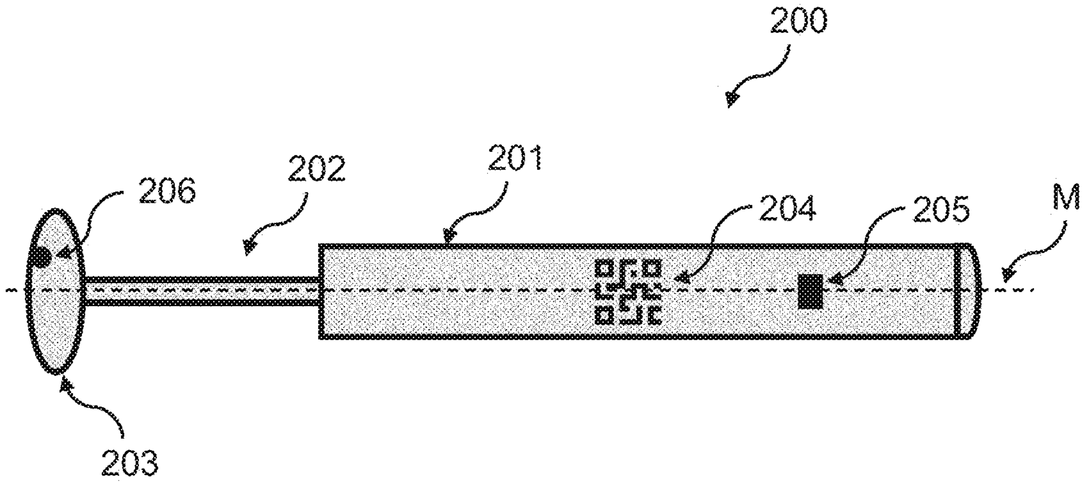
FIG. 9: A first schematic illustration of a calibration device according to embodiments of the present invention.

Examples of the above-mentioned calibration device are illustrated in FIGS. 8 and 9. It may be provided that the calibration process is started upon receiving a user input or upon automatically detecting that the calibration device 200 is in the calibration position. Detecting that the calibration device 200 is in the calibration position may include detecting a calibration triggering mark 205 of the calibration device 200. The calibration triggering mark 205 may be a visual mark as can be seen in FIGS. 8 and 9. In other words, a calibration process may be configured to start automatically upon detection of the visual marking. Therefore, by providing the visual marking, an additional user input and/or triggering signal is not necessary and a calibration process may be triggered automatically based on the detection of the visual marking.

Figure 2:
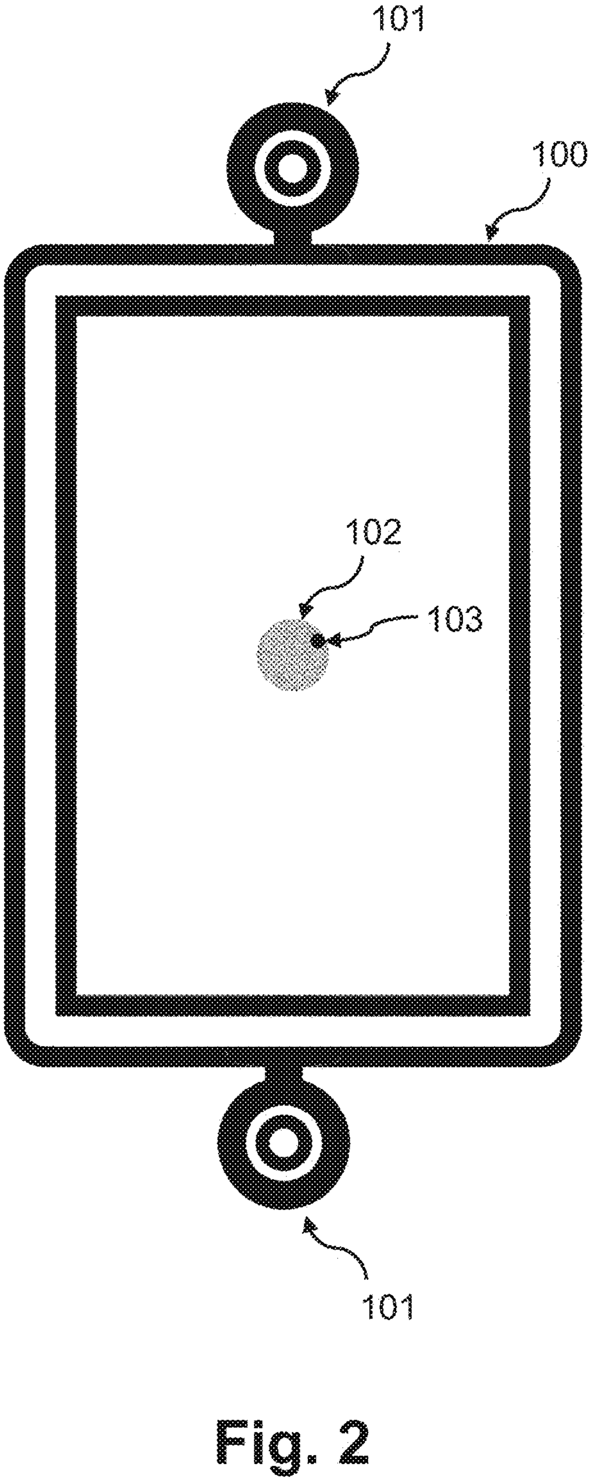
FIG. 2: A second schematic illustration of an electronic display screen according to embodiments of the present invention.

FIG. 2 is a second schematic illustration of an electronic display screen 100. Two depth cameras 101 are mounted at edges of the electronic display screen 100, one at the upper edge and one at the lower edge. As the calibration process is in progress, the electronic display screen 100 displays a calibration guiding mark 102 in the center of the electronic display screen 100 including an orientation reference marking 103. This unequivocally guides a user to a particular positioning of a calibration device 200 on the electronic display screen 100, in particularly to place the calibration device 200 on the electronic display screen 100 in a specific rotational orientation with respect to a plane-normal of the electronic display screen 100. The orientation reference marking 103 is provided at the edge of the displayed calibration guiding mark 102 in order to increase visibility while the calibration device 200 is placed on the calibration guiding mark 102.

For the calibration process, a respective calibration device 200, as illustrated in FIG. 9, may be used, having a corresponding orientation reference marking 206 on its footing surface 203. Thus, the user is supported to position calibration device correctly, in particular such that the respective orientation reference marking 206 and the respective displayed orientation reference marking 103 are at least partially overlapping. Providing an orientation reference marking will reduce the degrees of freedom in which the calibration device 200 may be placed on the electronic display screen 100 in an advantageous manner. The quality of a calibration process may therefore be enhanced.

Figure 3:
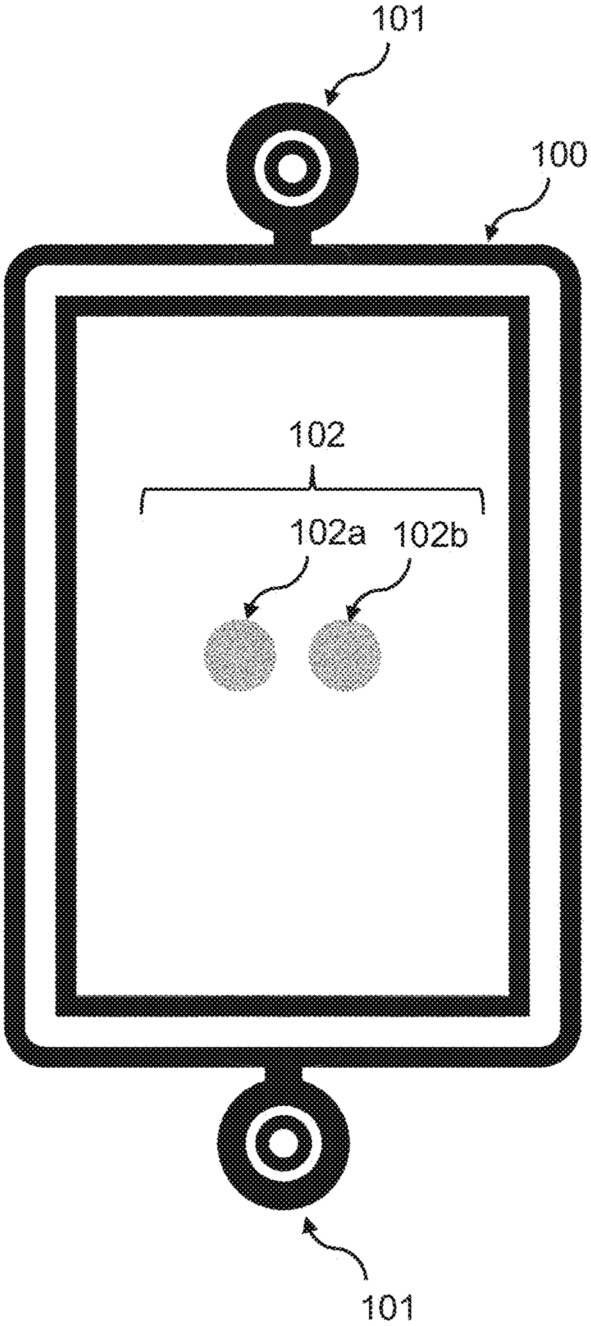
FIG. 3: A third schematic illustration of an electronic display screen according to embodiments of the present invention.

FIG. 3 is a third schematic illustration of an electronic display screen 100. Two depth cameras 101 are mounted at edges of the electronic display screen 100, one at the upper edge and one at the lower edge. As the calibration process is in progress, the electronic display screen 100 displays a calibration guiding mark 102 comprising two markings 102*a*, 102*b* in the center of the electronic display screen 100. If a calibration device 200 having to footings 202 is used, the user is guided by the marking 102*a*, 102*b* to place each of the footings 202 on respective calibration guiding marks 102*a*, 102*b*.

Figure 4:
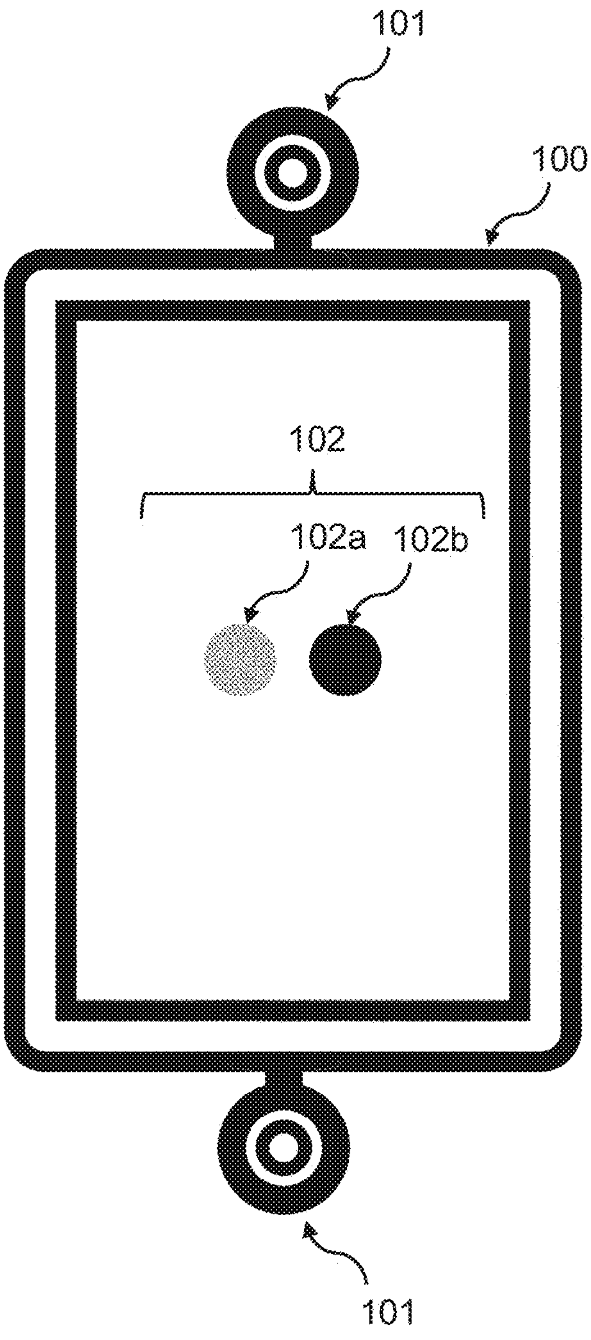
FIG. 4: A fourth schematic illustration of an electronic display screen according to embodiments of the present invention.

For further decreasing the degrees of freedom that are available for placing the calibration device 200 on the electronic display screen 100, it is referred to the fourth schematic illustration of an electronic display screen 100 in FIG. 4. In this example, the markings 102*a*, 102*b* have different colors. Accordingly, a respective calibration device 200 may be used having footings 202 and/or footing surfaces 203 with different colors.

Figure 5:
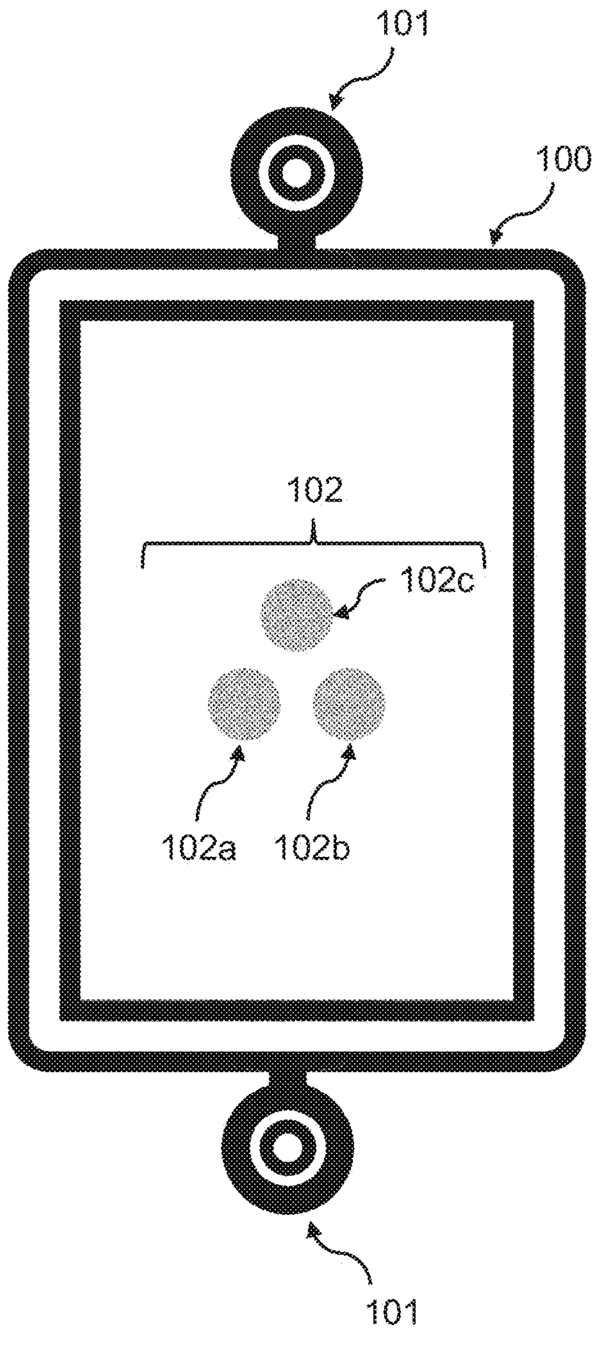
FIG. 5: A fifth schematic illustration of an electronic display screen according to embodiments of the present invention.
Figure 6:
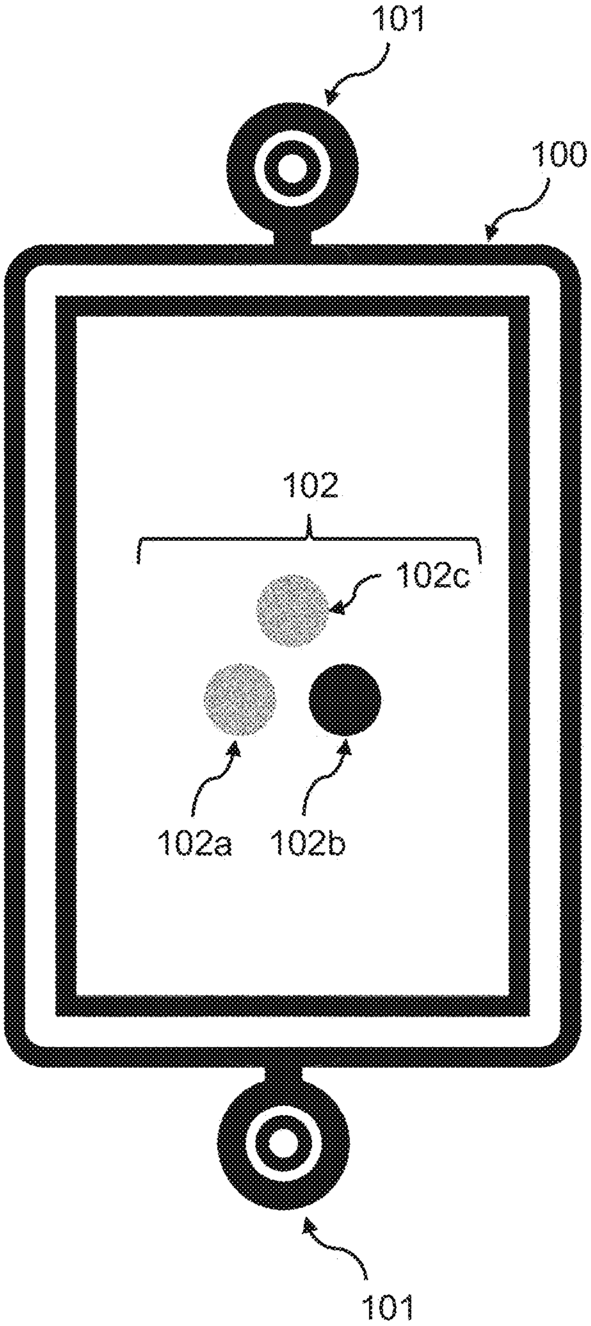
FIG. 6: A sixth schematic illustration of an electronic display screen according to embodiments of the present invention.

FIG. 5 illustrates a fifth embodiment of an electronic display screen 100 according to the present invention which displays three markings 102*a*, 102*b*, 102*c*. This decreases the risk of inaccuracies, e.g. resulting from positioning the calibration device 200 in a tilted manner. For further reducing the degrees of freedom, different colors may be used, as described above. An example with three markings 102*a*, 102*b*, 102*c*, the marking 102*c* having a different color, is illustrated in FIG. 6.

Figure 7:
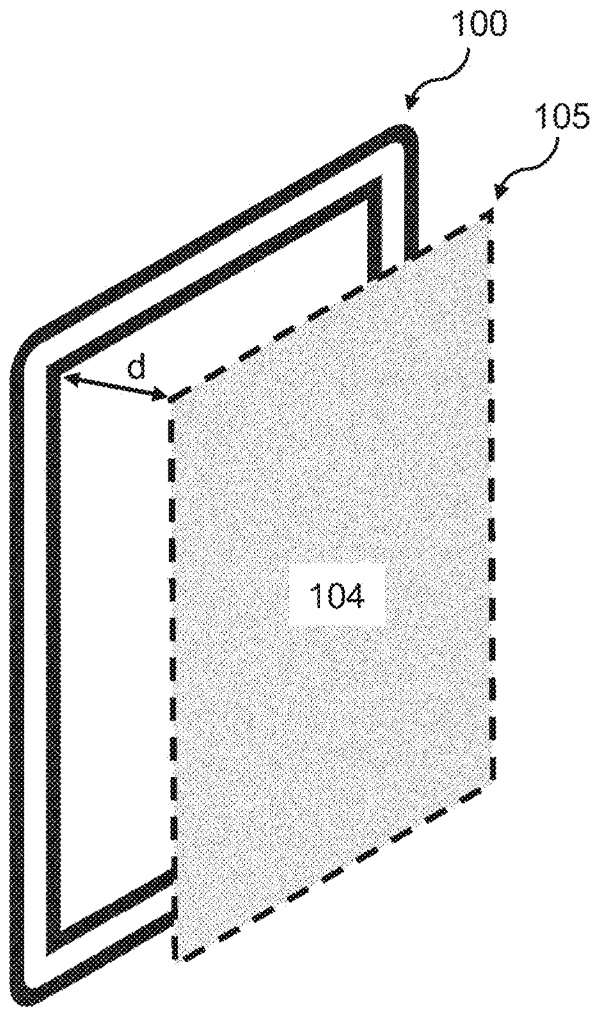
FIG. 7: A schematic illustration of an input area for gesture control according to embodiments of the present invention.

FIG. 7 illustrates the step of defining a touchless gesture control input area 104 for the electronic display screen 100 being observable by the at least one depth camera 101. For enabling gesture input, the input area 104 may include or be equal to a virtual screen layer 105 which is defined to extend distanced by a predetermined distance d parallel to the electronic display screen 100. In other words, the input area 104 may be a spatial area which is e.g. parallel to the screen layer and which is observed by the at least one depth camera 101 to recognize gesture inputs of users. Thus, it may be provided that determining a touchless gesture control input area comprises a definition of a virtual screen layer 105 being essentially parallel to the electronic display screen 100, preferably at a distance d.

In FIG. 8, a first schematic illustration of a calibration device 200 in accordance with embodiments of the present invention is shown. The calibration device 200 comprises a main body 201 along which a main axis M is defined. The main body 201 has a proximal end and a distal end. On the main body 201, a calibration triggering mark 205 is provided. Further, the calibration device 200 comprises a calibration pattern 204 which is schematically illustrated to be on the main body 201. Further, the calibration device 200 comprises a foot 202 having a footing surface 203. In FIG. 9, a second illustration of a calibration device 200 in accordance with embodiments of the present invention is shown. Compared to the calibration device 200 shown in FIG. 8, the calibration device of FIG. 9 further comprises a calibration reference marking 206 at its footing surface 203.

In the following, one embodiment of the present invention is described in different words. The person skilled in the art may understand and associate this wording in the context of the description above:

a) guiding the user where to put the calibration device by showing a calibration guiding mark being a spot in the center of the screen aa) showing not only one single spot but 2-3 guiding marks or one with a reference marker to preserve the angle be straight b) the user aligns the calibration device with the guiding mark on the screen ba) after that, the user presses a button or any key to signal the calibration module that the thing is ready to be calibrated bb) or auto detect that the calibration device is placed by analyzing another small AprilTag which triggers calibration and which is shown only when the stick is placed on the screen c) detecting the center of the calibration pattern of the calibration device in 3D and the rotation of it in 3D ca) by already knowing the shape of the calibration pattern, for example by use of a reference pattern, preferably a stored reference pattern, the center and the corners of the calibration pattern can be found in 2D, for example an RGB or Infrared module of the depth camera, in particular by analyzing the detected calibration pattern together with and/or using the reference pattern, cb) after that we need to transform 2D knowledge to 3D trough the other modules of the depth camera (adding depth information). To do that, we use the fact that Intel RealSense depth cameras which have two infrared sensors. The image disparity (difference in pixels of two particular images) is used to calculate the depth. So it is possible to get the depth of the center and the corners of the calibration pattern, and thus the 3D position of the calibration pattern.

cc) after that, the angle of the calibration device may be calculated based on the 3D corner points of the calibration pattern cd) based on that, it is possible to figure out the relative positions and rotations of the depth camera ce) at this stage, the cameras positions in the marker coordinate space are known but after that we will transform camera positions to the screen coordinate space d) what is missing are the screen corners because all the other parts of calibration are already known at this stage da) to find the corners of the screen we need to know the screen width and height in cm or inch db) and just by adding the respective half of the width and the height to the center we know the corners dc) how to know the physical width and height of the screen? We can ask a user or take it from the system (in Windows OS we can take resolution multiplied by pixel density)

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some or all of the method steps may be executed by (or using) a hardware apparatus, such as a processor, a microprocessor, a programmable computer or an electronic circuit. Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments of the invention provide a data carrier having electronically readable control signals, which are capable of cooperating with a programmable computer system, such that one of the methods described herein is performed.

Generally, embodiments of the invention can be implemented as a computer program (product) with a program code, the program code being operative for performing one of the methods when the computer program product runs on a computer. The program code may, for example, be stored on a machine-readable carrier. Other embodiments comprise the computer program for performing one of the methods described herein, stored on a machine-readable carrier. In other words, an embodiment of the present invention is, therefore, a computer program having a program code for performing one of the methods described herein, when the computer program runs on a computer.

A further embodiment of the invention provides a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention provides a data stream or a sequence of signals representing the computer program for performing one of the methods described herein. The data stream or the sequence of signals may, for example, be configured to be transferred via a data communication connection, for example, via the internet.

A further embodiment of the invention provides a processing means, for example, a computer or a programmable logic device, configured to, or adapted to, perform one of the methods described herein.

A further embodiment of the invention provides a computer having installed thereon the computer program for performing one of the methods described herein.

A further embodiment of the invention provides an apparatus or a system configured to transfer (e.g., electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

REFERENCE SIGNS

100 electronic display screen
101 depth camera
102 calibration guiding mark
102*a* marking
102*b* marking
102*c* marking
103 calibration reference marking
104 input area
105 virtual screen layer
d distance
200 calibration device
201 main body
M main axis
202 footing
203 footing surface
204 calibration pattern
205 calibration triggering mark
206 orientation reference marking

The invention claimed is:

1. A computer-implemented method of calibrating an electronic display screen for touchless gesture control using a calibration device having a calibration pattern, wherein the method comprises:

detecting, using at least one depth camera, the calibration pattern of the calibration device while the calibration device is placed on the electronic display screen in a calibration position;

determining borders of the electronic display screen based at least on the detected calibration pattern, a reference pattern stored in a memory which is usable for determining an orientation of the detected calibration pattern, and screen dimension information with respect to the electronic display screen, wherein the reference pattern is a digital representation or replica of the calibration pattern, wherein the orientation of the detected calibration pattern is calculated from distortions of the captured calibration pattern compared to the stored reference pattern; and defining a touchless gesture control input area for the electronic display screen being observable by the at least one depth camera.

2. The method of claim 1, further comprising:

displaying a calibration guiding mark on the electronic display screen for guiding a user to place the calibration device in the calibration position.

3. The method of claim 2, wherein the calibration guiding mark comprises at least two markings being displayed on the electronic display screen.

4. The method according to claim 2, wherein the calibration guiding mark comprises at least one orientation reference marking for unequivocally guiding a user to place the calibration device on the electronic display screen in a specific rotational orientation with respect to a plane-normal of the electronic display screen.

5. The method of claim 1, wherein at least the steps of detecting the calibration pattern, determining borders of the electronic display screen and defining a touchless gesture control input area are triggered upon receiving a user input or upon automatically detecting that the calibration device is in the calibration position.

6. The method of claim 1, wherein determining borders of the electronic display screen comprises at least one base transformation operation of a coordinate system.

7. The method of claim 1, wherein determining borders of the electronic display screen comprises:

determining, using the at least one depth camera, a center of the calibration pattern in 3D and defining a coordinate system, wherein the center of the calibration pattern is the origin of the coordinate system; and shifting the origin of the coordinate system orthogonal to the electronic display screen surface so that the origin of the coordinate system is in the plane of the electronic display screen surface.

8. The method of claim 1, wherein the screen dimension information with respect to the electronic display screen is received via user input and/or is determined automatically based on a resolution of the electronic display screen and based on a pixel density of the electronic display screen.

9. The method of claim 1, wherein detecting the calibration pattern of the calibration device is performed using two depth cameras, wherein the two depth cameras are arranged at borders of the electronic display screen.

10. The method of claim 1, wherein defining a touchless gesture control input area comprises a definition of a virtual screen layer being essentially parallel to the electronic display screen.

11. The method of claim 1, wherein the calibration pattern is a fiducial marker and/or a three-dimensional pattern.

12. The method of claim 1, further comprising outputting a signal upon starting, successfully ending, aborting, and/or failing the calibration of the electronic display screen.

13. A calibration device for use in the method according to claim 1 for calibrating an electronic display screen, the calibration device comprising:

a main body defining a main axis (M) of the calibration device;

a footing at a distal end of the main body, the footing having at least one footing surface being placeable on the electronic display screen such that the footing surface is in contact with to the electronic display screen; and a calibration pattern comprising a machine-readable pattern being detectable by at least one depth camera, wherein the at least one depth camera is arranged at or near the electronic display screen and is configured to observe a spatial area in front of the electronic display screen in order to detect a gesture input of a user, wherein the calibration pattern comprises one of an AprilTag, a QR code or a three-dimensional pattern having a spherical shape, wherein distortions of the calibration pattern compared to a stored reference pattern can be used to calculate an orientation of the calibration pattern as it is detected by the at least one depth camera.

14. A data processing apparatus comprising means for carrying out the method of claim 1.

15. A non-transitory storage medium having stored thereon computer program instructions which, when the computer program instructions are executed by a computer, cause the computer to carry out the method of claim 1.

* * * * *